(12) United States Patent
Bennetts et al.

(10) Patent No.: US 8,725,994 B2
(45) Date of Patent: May 13, 2014

(54) LAUNCHING AN APPLICATION FROM A POWER MANAGEMENT STATE

(75) Inventors: Christopher Lee Bennetts, Taipei (TW); Nozomu Yasui, Taipei (TW); Lee Aktinson, Taipei (TW); Kenji Okamoto, Taipei (TW); Shibata Masakazu, Houston, TX (US); Kiow Hong Josephine Tan, Taipei (TW); Chrismal R. Panditharathne, Negombo (LK)

(73) Assignee: Hewlett-Packard Development Company, L.P., Houston, TX (US)

( * ) Notice: Subject to any disclaimer, the term of this patent is extended or adjusted under 35 U.S.C. 154(b) by 730 days.

(21) Appl. No.: 12/742,601

(22) PCT Filed: Nov. 13, 2007

(86) PCT No.: PCT/US2007/084533
§ 371 (c)(1),
(2), (4) Date: Sep. 13, 2010

(87) PCT Pub. No.: WO2009/064287
PCT Pub. Date: May 22, 2009

(65) Prior Publication Data
US 2011/0004749 A1 Jan. 6, 2011

(51) Int. Cl.
*G06F 9/00* (2006.01)
*G06F 9/44* (2006.01)

(52) U.S. Cl.
CPC .......... *G06F 9/4401* (2013.01); *G06F 9/4406* (2013.01); *G06F 9/441* (2013.01)

USPC .................................................... 713/1; 713/2

(58) Field of Classification Search
CPC ...... G09F 9/4401; G09F 9/4406; G09F 9/441
USPC .................................................. 713/1, 320, 2
See application file for complete search history.

(56) References Cited

U.S. PATENT DOCUMENTS

| | | | |
|---|---|---|---|
| 6,032,255 A * | 2/2000 | Shim et al. ........................ | 713/2 |
| 6,212,439 B1 * | 4/2001 | Cha ................................. | 700/83 |
| 6,839,836 B2 * | 1/2005 | Cole et al. ......................... | 713/2 |
| 7,707,400 B2 * | 4/2010 | Soin et al. ........................ | 713/2 |
| 2003/0083761 A1 * | 5/2003 | Jacobs et al. .................... | 700/94 |
| 2003/0229765 A1 | 12/2003 | Suzuoki et al. | |
| 2006/0161982 A1 | 7/2006 | Chari et al. | |
| 2007/0050854 A1 | 3/2007 | Cooperstein et al. | |
| 2007/0101392 A1 | 5/2007 | Soin et al. | |

OTHER PUBLICATIONS

International Search Report and Written Opinion dated Jul. 30, 2008, pp. 9.

* cited by examiner

*Primary Examiner* — Chun Cao (57) ABSTRACT

A method for launching a selected application in a computer system that is either in a sleep state or a power-off state, the computer system includes an operating system (OS) installed therein to execute applications in a normal mode of the OS. The method includes, while the computer system is in one of the sleep state and the power-off state, receiving a command to launch the selected application in the computer system, loading the OS in a sandbox mode preconfigured for the selected application, and the OS in the sandbox mode launching the selected application to run in the computer system.

15 Claims, 5 Drawing Sheets

LAUNCHING AN APPLICATION FROM A POWER MANAGEMENT STATE

BACKGROUND

Mobile, desktop and server computing devices of today typically employ power management schemes to promote and implement energy efficiency for the devices. A common power management scheme is the Advanced Configuration and Power Interface (ACPI) open-industry specification that was co-developed by Hewlett-Packard™, Intel™, Microsoft™, Phoenix™, and Toshiba™.

According to the ACPI specification, an ACPI-compliant device can be in one of the seven power states S0-S5 and G3. The S0 power management state (hereinafter, "power state") denotes the power-on state of the device, whereby the device's operating system (OS) and applications may be running with its central processing unit (CPU) executing instructions. The next four power states S1-S4 denote various sleep modes. In the S1 power state, power to the CPU and random access memory (RAM) is maintained, and other components in the device are powered down if they do not indicate the need to remain on. In the S2 power state, the CPU is further powered off. In the S3 power state, also known as "standby" in Microsoft™ Windows OS devices, RAM remains powered, but most other components in the device are powered down. In the S4 power state, also known as "hibernation" in Microsoft™ Windows OS devices, RAM is also powered off; however, all of its content is saved to a hard drive to preserve the states of the OS, applications, open documents, etc. Thus, the S2-S4 power states are referred herein as the sleep states because the CPU is powered off.

The next power state is S5, also known as a "soft off," wherein the CPU and RAM are powered off, but some components remain powered so the computer can wake up from various inputs such as a keyboard, local area network (LAN), or a universal serial bus (USB) device. However, a boot procedure is required to bring the device back up online from S5 to S0 state. The last power state is G3, which is the opposite of the S0 power state. The G3 power state is also known as "mechanical off," wherein all components (except for those running on small batteries) in the device is powered down, and the device's power consumption is substantially zero. Thus, the S5 and G3 power states are referred herein as the power-off states.

Not all ACPI-compliant devices implement all ACPI power states. For example, most home personal computers (PCs), such as desktop and laptop PCs, that run Microsoft Windows™ operating systems (OS'es) are provided with four states, S0 for power on, S3 for standby, S4 for hibernation, and G3 for complete power off or mechanical off.

In a typical computing device with an OS that supports an application launch from an ACPI state (or a power state of any other power management scheme), if the device and its OS go into a sleep mode in S2-S4 states or a power-off mode in the S5-G3 states, the user must "wake up" or power up the device and most often has to login before proceeding to the application launch. Thus, the user must waste additional time waiting for the ACPI-compliant device to achieve the S0 power-on state for the OS to be fully functional in normal mode before a desired application can be manually or automatically launched from within the OS in the normal mode. As understood and referred herein, an OS when operating in its normal mode in a computing device provides full functionalities to manage the sharing of resources of the computing device and provide users with an interface to access such resources. An example of an OS normal mode is the normal mode (as opposed to, for example, the safe mode) of Microsoft Windows OS products.

The aforementioned additional time delay for device wake-up or power-up is especially pronounced when the device is initially in either the S5 or G3 state, whereupon a command from the user, the device must implement a boot procedure or sequence to start various initialization procedures and tests, such as a power-on self-test program (POST) and a basic input output system (BIOS) program in the device's firmware, and to load the OS. Thereafter, the desired application may be launched from within the OS. Consequently, such a time delay reduces the user's productivity as the user must wait for the boot procedure to complete and the desired application to launch. It also produces a negative effect on the user's overall experience with the computing device.

Furthermore, when the user wishes to close an application and place the ACPI-compliant device in a deep sleep mode in the S4 or S5 state, or a power off mode in the G3 state, the device may not power down properly if other features and/or applications remain running with the device's OS. This is not safe and may corrupt one or more of the running features and applications.

There exist solutions that allow direct launch of an application through a partitioning of the device's main memory to have a main OS for a normal booting procedure and a normal running of applications within the OS and a second OS that can directly access the direct-launch application without having to go through the normal booting procedure in the main OS. Because the second OS only needs to launch one application, it needs not go through the typical extensive boot procedure to support the single-application launching. Thus, it is able to boot up the device and launches the application quickly. For example, an ACPI-compliant device may have one or more hardware direct-launch buttons thereon to allow a user to directly launch an application particular to each button. When the user presses, or otherwise activates, a direct-launch button, the device will be booted up by the second-OS partition, which then automatically launches an application corresponding to the activated direct-launch button. Consequently, these existing solutions employ at least two OS'es and two partitions for a device, which further complicate the design, manufacturing, and reliability of such a device.

Accordingly, there is a desire to provide more simplified solutions that can continue to implement energy efficiency of computing devices while increasing a user's positive experience with such devices.

BRIEF DESCRIPTION OF THE DRAWINGS

Embodiments are illustrated by way of example and not limited in the following figures(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are systems and methods for providing power efficiency and power saving solutions to computing devices while supporting direct launching of various applications in the computing devices when in deep sleep and power-off modes in order to improve the productivity and positive experience of users using such devices.

According to various embodiments described herein, a device that is ACPI-compliant, or otherwise compliant with another power management scheme, is provided with one or more direct-launch hardware or physical buttons thereon. These hardware or physical buttons (as opposed to virtual or software button) are referred herein as quick-start buttons, and they are in addition to the power button or mechanism typically found on such a device to turn on/off the device. They may be implemented for frequently-used applications to provide the user with quick access to such applications via actions (such as pressing or pushing) on such buttons. Examples of a quick-start application include but are not limited to: DVD playback, watching television, watching a video from a video file stored in the device; listening to music from music files stored in the device; surfing the Internet and World Wide Web; launching an appointment calendar for review and editing.

Figure 1:
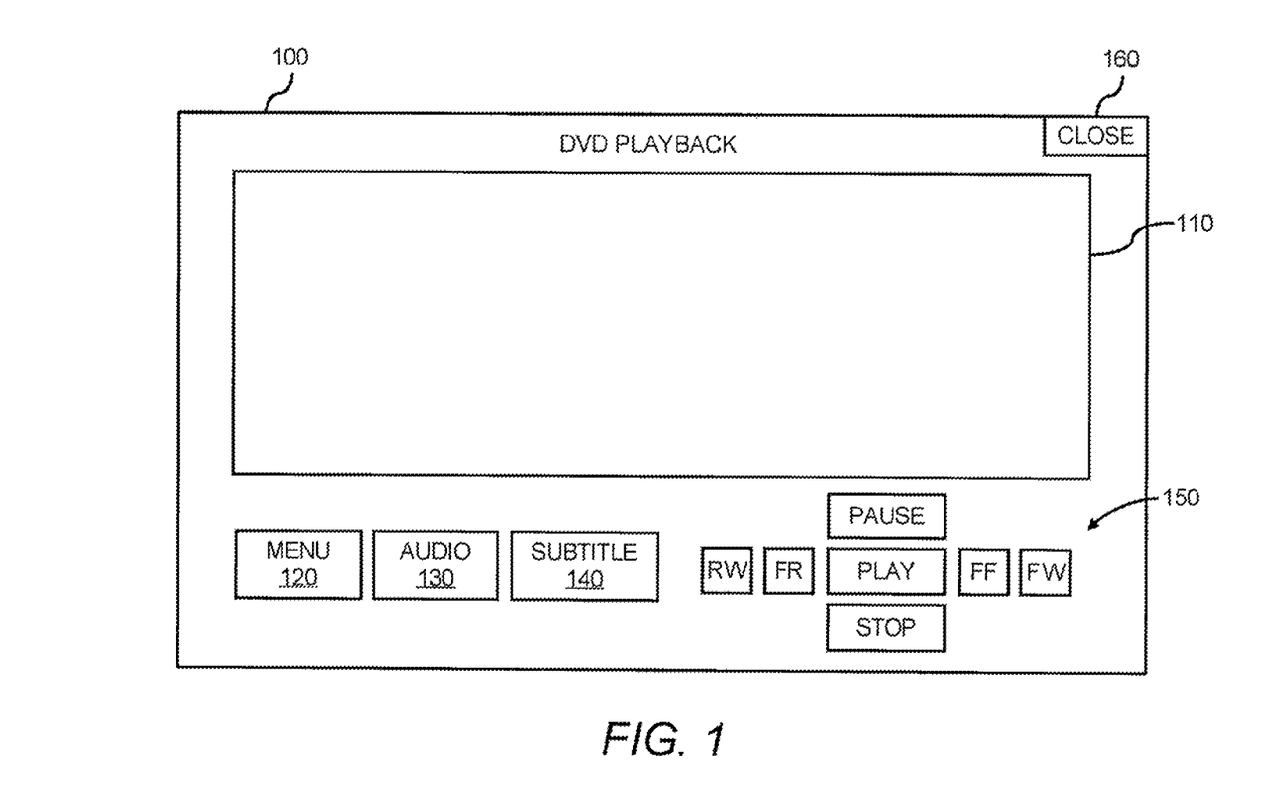
FIG. 1 illustrates a splash page for a quick-start application, according to an embodiment.

In one embodiment, each quick-start button provides the device user with a direct launching of a corresponding quick-start application without the need to go through an OS boot sequence or procedure as described earlier. For example, FIG. 1 illustrates a splash page 100 for a quick-start DVD playback application that takes the user directly to the quick-start DVD playback application, as selected by the user through activation of one of the quick-start buttons, in accordance with one embodiment. The splash page 100 may be a graphical user interface (GUI), such as a screen, provided on a display component of the device that identifies the quick-start application that the user has launched.

As illustrated in FIG. 1, the splash page or GUI 100 includes a portion 110 for playback of the DVD content, various control buttons for accessing the DVD menu 120, audio playback of the DVD 130, and subtitle selection 140 for the DVD playback. The GUI 100 also includes control buttons 150 for DVD playback, such as playing, pausing, stopping, fast forwarding (FF), fast rewinding (FR), forwarding to next chapter (FW), and rewinding to last chapter (RW). The GUI 100 further includes a close button 160 for the user to terminate the quick-start application, at which time the device may revert back to its initial power state or to a predetermined power state.

Figure 2:
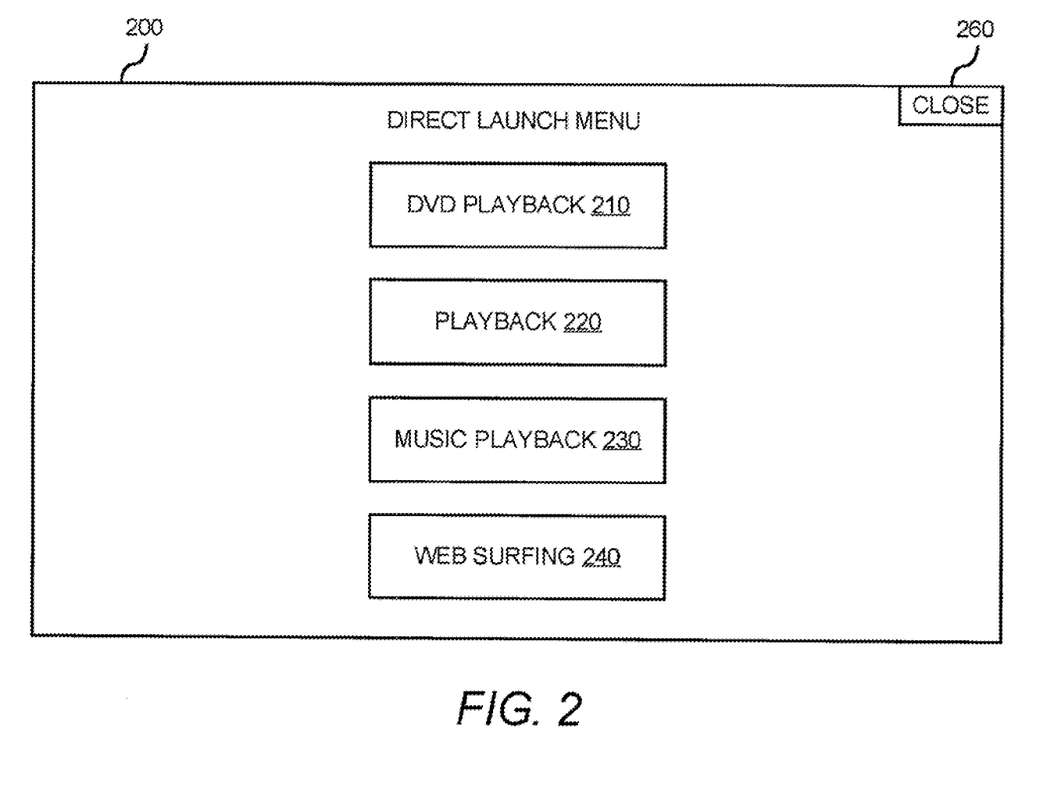
FIG. 2 illustrates a splash page for a listing of available quick-start applications, according to an embodiment.

In another embodiment, a single (or multiple) quick-start button may be provided on the device which allows the device user to select one from multiple available quick-start applications for direct launch. For example, FIG. 2 illustrates a splash page 200 for a menu or listing of available quick-start applications, from which the user may select one application for direct launching, in accordance with one embodiment. As with the splash page 100, the splash page 200 may be a GUI, such as a screen, provided on a display component of the device that provides the user with a menu of quick-start applications for a direct-launch selection.

As illustrated in FIG. 2, the splash page or GUI 200 includes a plurality of buttons for direct launching of DVD playback 210 for one or more DVDs inserted in or otherwise accessible by the device, video playback 220 of one or more video files stored on or otherwise accessible by the device, music playback 230 of one or more audio files stored on or otherwise accessible by the device, or web surfing 240 for accessing the Internet and World Wide Web. The GUI 200 also includes a close button 260 to terminate the GUI 200 and selection of an application for direct-launching therefrom. Once the user selects one of the available quick-start applications for direct launching, for example, by clicking on a corresponding one of the buttons 210-240, the user may be presented with another splash page or GUI specific for the selected quick-start application. For example, if the user selects DVD playback through button 210, the user may be presented with the GUI 100 as described earlier.

Once the user terminates the quick-start application (or it is otherwise terminated), the device may be returned to its previous power state or any other predetermined power state. Thus, the user does not need to login to a user account in an OS to further access the quick-start application or see other applications in the OS desktop environment, such as a Microsoft Windows™ desktop environment.

Figure 3:
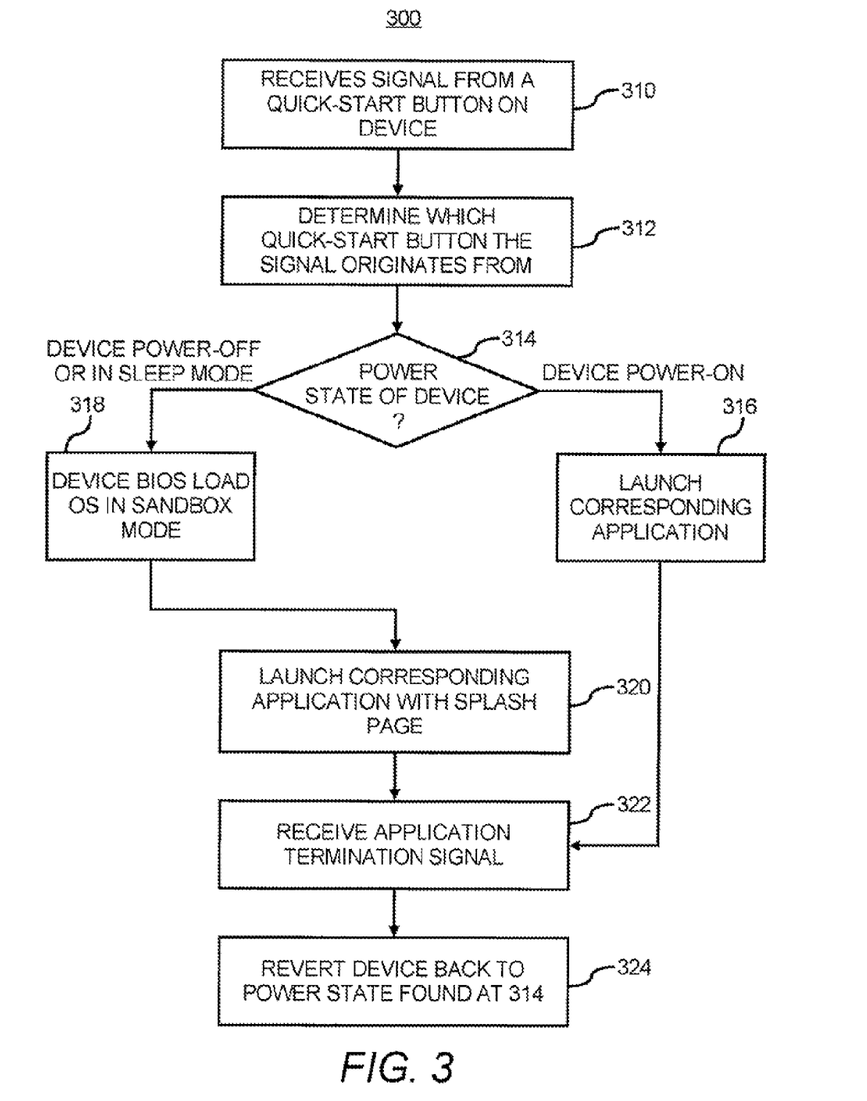
FIG. 3 illustrates a method for launching a selected application in a computing device, according an embodiment.

FIG. 3 illustrates a method for directly launching a selected application in a computing device, such as a computer system, while the computer system is in one of the sleep states S2-S4 or one of the power-off states S5-G3, in accordance with one embodiment. In this embodiment, the computer system is provided with a plurality of hardware buttons, each corresponding to a different application that may be directly launched in the computer system without having to go through a boot procedure or sequence to boot up the OS of the computer system to its normal mode.

At 310, the computer system receives a command from one of the hardware buttons to directly launch a quick-start application corresponding to the one hardware button.

At 312, the firmware or basic input/output system (BIOS) of the computer system determines from which hardware button the command originates so as to determine the particular quick-start application selected to launch.

At 314, the firmware or BIOS of the computer system next determines or detects a current power state of the computer system.

At 316, if the computer system is currently in a power-on state, the BIOS releases its control of the computer system, so that the OS that is currently operating in the computer system can launch the selected quick-start application within the OS in its normal mode.

At 318, however, if the computer system is currently in one of the sleep states (e.g., S2-S4 states in ACPI), or in one of the power-off states (e.g., S5 and G3 states in ACPI), the firmware or BIOS of the computer system loads the OS in a sandbox mode preconfigured to launch the selected quick-start application, and no other applications that are usually available in the OS when it operates in normal mode. As understood in the art and referred herein, an OS sandbox mode indicates an isolated environment in which the OS is provided with preconfigured features or abilities to run one or more predetermined applications or execute one or more predetermined functions.

In one embodiment, an OS sandbox mode is a special quick-start user account to which the OS is loaded, whereby access controls such as parental controls are applied a priori to change the OS registries pointed to by the quick-start user account in order to limit the account to launch only the selected quick-start application. Thus, an OS sandbox mode provides a limited user account in the OS with limited features and functions, such as no administrative privileges, so that such a user account can be logged into and loaded up quickly (without the need to load up all features and functionalities available to the OS in its normal mode). A hardware quick-start button then provides a command that includes an account password to provide fast-user-switching to the limited user account, that is, to load up the corresponding OS sandbox mode. If the computer system includes multiple hardware quick-start buttons for direct launching of multiple applications, each hardware button corresponds to a particular OS sandbox mode, which is a preconfigured quick-start user account specific to a corresponding application that may be directly launched with the hardware button. The user is not able to modify the OS in a sandbox mode so as to directly launch an application that was not previously configured for such an OS sandbox mode.

Referring back to FIG. 3, at 320, the OS in the sandbox mode launches a splash page, an example of which is illustrated in FIG. 1, which takes the user directly to the selected quick-start application without the user having to wait for the computer system to power up and the OS therein to boot up and operate in its normal mode because the quick-start application can be launched.

At 322, once the selected quick-start application is launched, the computer system may receive a command to terminate the running of the quick-start application. This command may be a signal generated by the user (for example, the user clicking on the close button 160 in FIG. 1).

At 324, the OS reverts the device back to the power state detected at 314, or to any predetermined power state as desired.

Figure 4:
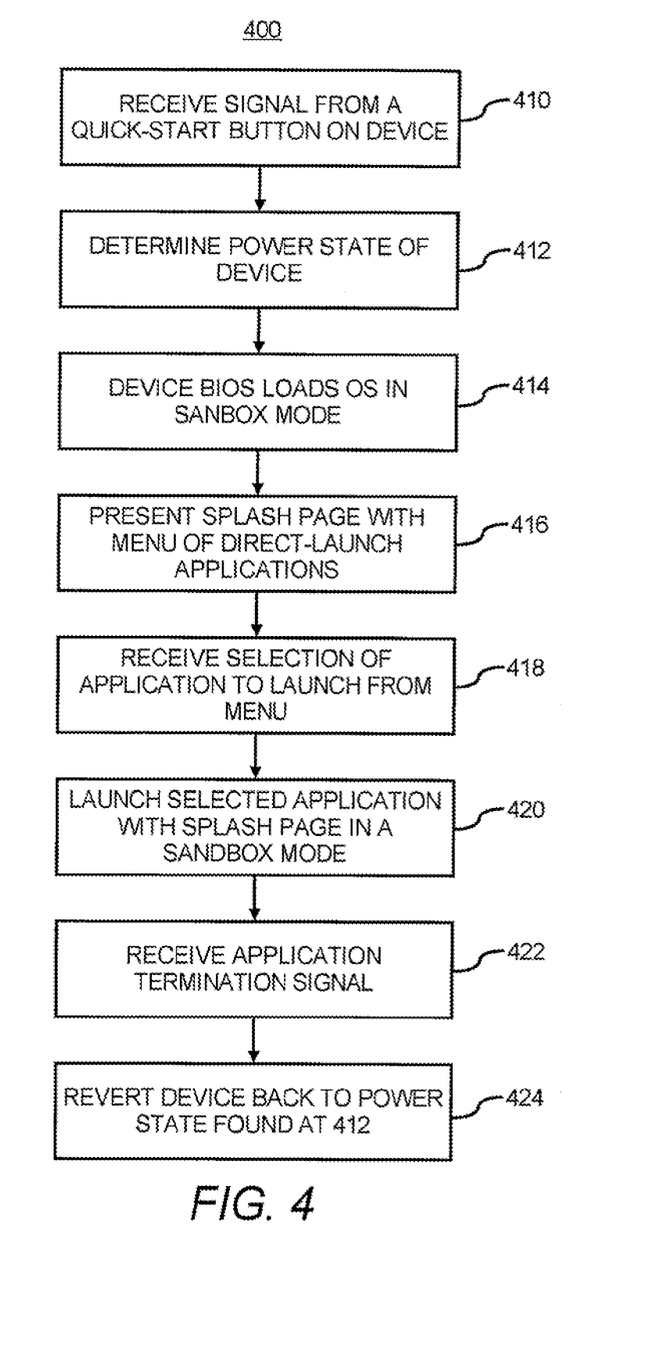
FIG. 4 illustrates another method for launching a selected application in a computing device, according another embodiment.

FIG. 4 illustrates a method for directly launching a selected application in a computing device, such as a computer system, while the computer system is in one of the sleep states S2-S4 or one of the power-off states S5-G3, in accordance with one embodiment. In this embodiment, the computer system is provided with a single (or multiple) hardware button that is operable to list multiple quick-start applications that are available for direct launching.

At 410, the computer system receives a command from hardware button to directly launch a quick-start application.

At 412, the firmware or BIOS of the computer system next determines or detects a current power state of the computer system. If the computer system is currently in a power-on state, the BIOS releases its control of the computer system, so that the OS that is currently operating in the computer system can launch any typical menu, such as an "All Programs" menu in Microsoft Windows™ to show a listing of applications available for operation within the OS in normal mode.

However, at 414, it is assumed that the computer system is currently in one of the sleep states (e.g., S2-S4 states in ACPI), or in one of the power-off states (e.g., S5 and G3 states in ACPI). Thus, the firmware or BIOS of the computer system loads the OS in a sandbox mode preconfigured to launch a listing or menu of quick-start applications that are available for direct launching. The sandbox mode may be as described earlier.

At 416, the OS operating in sandbox mode presents a splash page that provides a listing or menu of quick-start applications available for direct launching. An example of such a menu is illustrated in FIG. 2 above. Again, the OS in this sandbox mode allows no application to be launched other than the aforementioned listing or menu of available quick-start applications for direct launching.

At 418, the firmware or BIOS receives a user selection of a quick-start application to launch from the menu.

At 420, the firmware or BIOS proceeds to command the OS to operate in another sandbox mode preconfigured for launching the selected application with a corresponding splash page (e.g., FIG. 1) that takes the user directly to the selected quick-start application.

At 422, once the selected quick-start application is launched, the computer system may receive a command to terminate the running of the quick-start application. This command may be a signal generated by the user (for example, the user clicking on the close button 260 in FIG. 2).

At 424, the OS reverts the device back to the power state detected at 412, or to any predetermined power state as desired.

Figure 5:
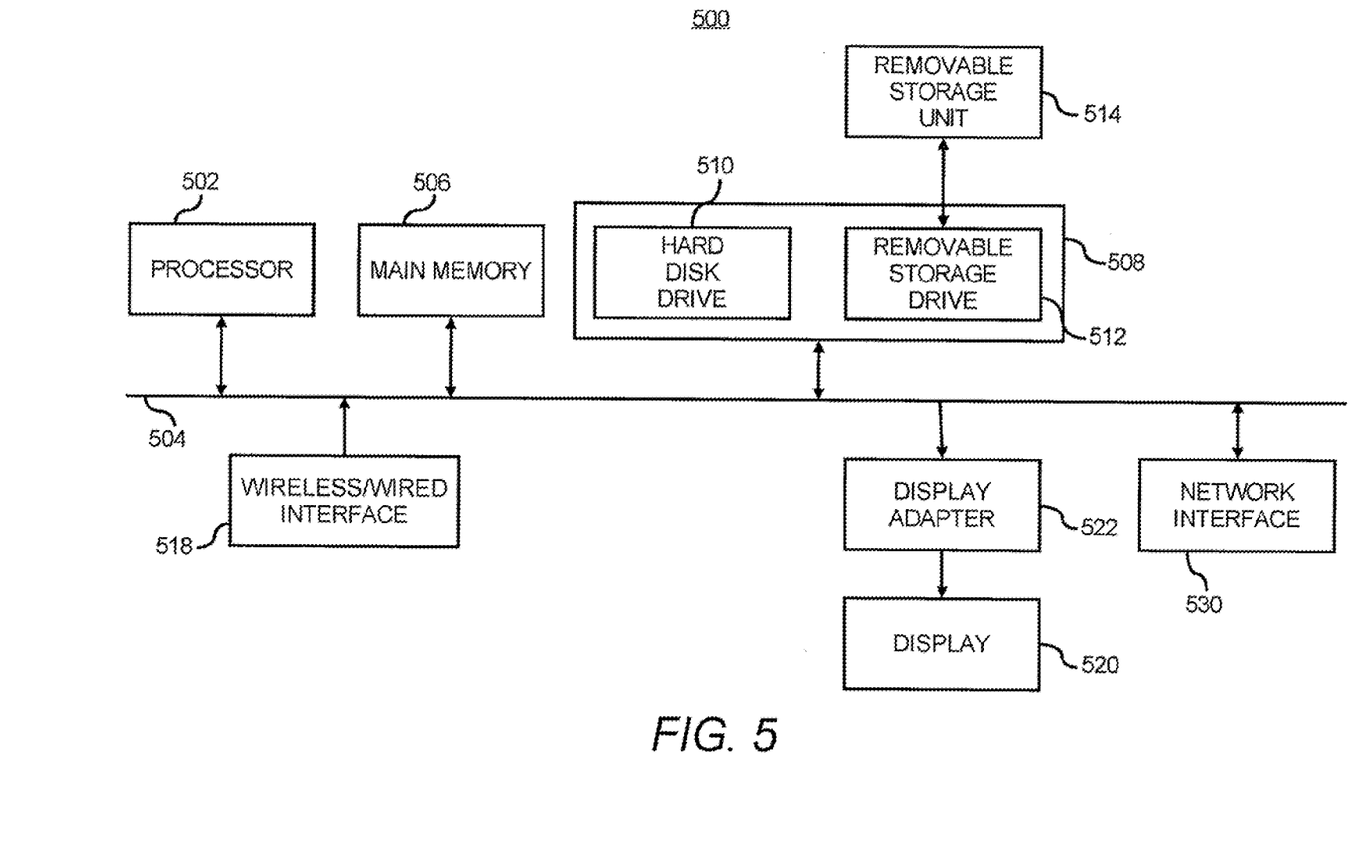
FIG. 5 illustrates a computerized system that is operable to be used as a platform for implementing a computing device, according to one embodiment.

FIG. 5 illustrates a block diagram of a computerized system 500 that is operable to be used as a platform for implementing the computing device described in methods 300 and 400. The computerized system 500 includes one or more processors, such as processor 502, providing an execution platform for executing software. Thus, the computerized system 500 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 502 are communicated over a communication bus 504 or through point-to-point links with other components in the computer system 500.

The computer system 500 also includes a main memory 506 where software is resident during runtime, and a secondary memory 508. The secondary memory 508 may also be a computer-readable medium (CRM) that may be used to store the OS and/or the firmware/BIOS as described in methods 300 and 400. The main memory 506 and secondary memory 508 (and an optional removable storage unit 514) each includes, for example, a hard disk drive and/or a removable storage drive 512 representing a floppy diskette drive, a magnetic tape drive, a compact disk drive, etc., or a nonvolatile memory where a copy of the software is stored. In one example, the secondary memory 508 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computer system 500 includes a display 520 connected via a display adapter 522, user interfaces comprising one or more input devices 518, such as a keyboard, a mouse, a stylus, and the like. The display 520 provides a display component for displaying the GUI 100 (FIG. 1) and GUI 200 (FIG. 2), for example. However, the input devices 518 and the display 520 are optional. A network interface 530 is provided for communicating with other computer systems via, for example, a network.

Accordingly, the systems and methods as described herein for a computing device enables the device user to launch an application directly from a sleep state or a power-off state of the device, whereby the user is not subjected to a time delay due to a login process to login to a user account, viewing an OS desktop, or a typical boot procedure or sequence to boot up the computing device and the OS therein to full operation in the OS normal mode.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for launching a selected application in a computer system that is in one of a first sleep state and a first power-off state, the computer system includes an operating system (OS) installed therein to execute applications in a normal mode of the OS, the method comprising:
   receiving a command to launch the selected application in the computer system;
   responsive to receiving the command to launch the selected application, determining a power state of the computer system;
   responsive to the determining that the power state of the computer system is a power-on state, launching the selected application within the OS in the normal mode of the OS; and
   responsive to the determining that the power state of the computer system is one of a sleep state and a power-off state:
      loading the OS in a sandbox mode preconfigured for the selected application;
      the OS in the sandbox mode launching the selected application to run in the computer system;
      receiving a command to terminate the running of the selected application in the computer system; and
      placing the computer system in one of a second sleep state and a second power-off state.

2. The method of claim 1, wherein the first sleep state is the same as the second sleep state, and the first power-off state is the same as the second power-off state.

3. The method of claim 1, wherein the second sleep state is a predetermined sleep state different from the first sleep state, and the second power-off state is a predetermined power-off state different from the first power-off state.

4. The method of claim 1, wherein receiving the command to launch the selected application comprises:
   receiving the command as a signal generated from one of a plurality of hardware buttons available on the computer system, each hardware button is for launching a corresponding application in the computer.

5. The method of claim 1, wherein receiving the command to launch the selected application comprises:
   while the computer system is in one of the sleep state and the first power-off state, receiving a first command to launch a listing of a plurality of applications available for launching in the computer system; and
   subsequent to receiving the first command, receiving a second command selecting one of the plurality of applications as the selected application to launch in the computer system.

6. The method of claim 5, wherein loading the OS in a sandbox mode preconfigured for the selected application comprises:
   responsive to the received first command, first loading the OS in an initial sandbox mode preconfigured to operate a listing of available applications to launch; and
   responsive to the received second command, second loading the OS in the sandbox mode preconfigured for the selected application.

7. A computing device for launching a selected application, the computing device comprising:
   an operating system (OS) to execute the selected application in a normal mode of the OS, and in a sandbox mode preconfigured to execute the selected application;
   at least one hardware button to provide a first command to:
      launch the selected application within the normal mode of the OS when the at least one hardware button is activated while the computing device is in a power-on state; and
      launch the selected application in the sandbox mode preconfigured to execute the selected application when the at least one hardware button is activated while the computing device is in one of a sleep state and a power-off state; and
   a firmware responsive to the first command from the hardware button to
      issue a second command to the OS to operate in the sandbox mode and launch the selected application while the computing device is in one of the sleep state and the power-off state;
      receive a command to terminate execution of the selected application in the computing device; and
      placing the computing device in one of a second sleep state and a second power-off state.

8. The computing device of claim 7, wherein the OS sandbox mode preconfigured to execute the selected application comprises:
   one or more applied access controls wherein the OS is able to launch only the selected application.

9. The computing device of claim 7, wherein the OS sandbox mode is a predetermined user account with preconfigured access controls.

10. The computing device of claim 7, wherein the at least one hardware button provides a second command to launch a listing of available applications for launching while the computing device is in one of the sleep state and the power-off state.

11. The computing device of claim 10, wherein the first command to launch the selected application is provided from a user selection of one of the available applications to launch from the listing as provided by the second command.

12. The computing device of claim 10, wherein the second command sets the OS to operate in a sandbox mode preconfigured to only provide the listing of available applications for launching while the computing device is in one of the sleep state and the power-off state.

13. The computing device of claim 7, wherein the at least one hardware button includes a plurality of hardware buttons, each provides a command to launch a different selected application while the computing device is in one of the sleep state and the power-off state.

14. The computing device of claim 7, wherein the at least one hardware button comprises a plurality of hardware buttons, each hardware button being user activated to launch a listing of available applications for launching while the computing device is in one of the sleep state and the power-off state.

15. A non-transitory computer readable medium, stored in a computer system that is in one of a sleep state and a power-off state and includes an operating system (OS) installed therein to execute applications in a normal mode of the OS, the computer readable medium is encoded with program code, that when executed by a processing unit in the computer system causes the processing unit to:
   receive a command to launch the selected application in the computer system;

determine a power state of the computer system at the time of receiving the command to launch the selected application;

responsive to a determination that the power state of the computer system is a power-on state, launch the selected application within the OS in the normal mode of the OS;

responsive to a determination that the power state of the computer system is one of a sleep state and a power-off state:
- load the OS in a sandbox mode preconfigured for the selected application; and
- operate the OS in the sandbox mode to launch the selected application to run in the computer system; and responsive to a command to terminate running of the selected application in the computer system, place the computer device in one of a second sleep state and a second power-off state.

\* \* \* \* \*

UNITED STATES PATENT AND TRADEMARK OFFICE
CERTIFICATE OF CORRECTION

| | | |
|---|---|---|
| PATENT NO. | : 8,725,994 B2 | |
| APPLICATION NO. | : 12/742601 | |
| DATED | : May 13, 2014 | |
| INVENTOR(S) | : Christopher Lee Bennetts et al. | |

It is certified that error appears in the above-identified patent and that said Letters Patent is hereby corrected as shown below:

On the Title Page, Item (75), Inventors, in column 1, line 3, delete "Aktinson," and insert
-- Atkinson, --, therefor.

In the Claims

In column 8, line 17, in Claim 7, after "to" insert -- : --.

Signed and Sealed this
Twelfth Day of August, 2014

Michelle K. Lee
*Deputy Director of the United States Patent and Trademark Office*